United States Patent
Cooper et al.

(10) Patent No.: US 10,481,771 B1
(45) Date of Patent: Nov. 19, 2019

(54) SYSTEMS AND METHODS FOR CONTROLLING THE DISPLAY OF ONLINE DOCUMENTS

(71) Applicant: Google Inc., Mountain View, CA (US)

(72) Inventors: Sarah Cooper, New York, NY (US); Mikhail Leder, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 89 days.

(21) Appl. No.: 15/248,848

(22) Filed: Aug. 26, 2016

Related U.S. Application Data (63) Continuation of application No. 13/275,123, filed on Oct. 17, 2011.

(51) Int. Cl.
| | |
|---|---|
| *G06F 3/048* | (2013.01) |
| *G06F 3/0484* | (2013.01) |
| *H04L 29/08* | (2006.01) |
| *H04L 12/18* | (2006.01) |

(52) U.S. Cl.
CPC ........ *G06F 3/0484* (2013.01); *H04L 12/1813* (2013.01); *H04L 67/02* (2013.01)

(58) Field of Classification Search
CPC .. G06F 17/211; G06F 17/2235; G06F 17/248; G06F 17/30056; G06F 3/1454; G06F 3/0484; H04L 67/06; H04L 12/1813; H04L 67/02
See application file for complete search history.

(56) References Cited

U.S. PATENT DOCUMENTS

| | | |
|---|---|---|
| 5,146,552 A | 9/1992 | Cassorla et al. |
| 5,231,577 A | 7/1993 | Koss |
| 5,408,470 A | 4/1995 | Rothrock et al. |
| 5,708,826 A | 1/1998 | Ikeda et al. |
| 5,758,358 A | 5/1998 | Ebbo |
| 5,761,669 A | 6/1998 | Montague et al. |
| 5,793,966 A | 8/1998 | Arnstein et al. |
| 5,799,325 A | 8/1998 | Rivette et al. |
| 5,819,304 A | 10/1998 | Nilsen et al. |
| 6,049,664 A | 4/2000 | Dale et al. |
| 6,061,697 A | 5/2000 | Nakao |
| 6,073,144 A | 6/2000 | van Hoff |
| 6,243,706 B1 | 6/2001 | Moreau et al. |
| 6,327,584 B1 | 12/2001 | Xian et al. |

(Continued)

OTHER PUBLICATIONS

MrNate, My Experiences Working with Google Docs Presentations, published Mar. 5, 2009 by the Dopefly Tech Blog, pp. 1-4.*

(Continued)

*Primary Examiner* — Stephen S Hong
*Assistant Examiner* — Ahamed I Nazar
(74) *Attorney, Agent, or Firm* — Lowenstein Sandler LLP (57) ABSTRACT

In many aspects, the systems and methods described herein include software and hardware for controlling, from one browser window, the display of information in an online document processing application on another browser window. For example, the systems and methods described herein provide a user with the ability to view a presentation slide deck on a first browser window while simultaneously viewing speaker notes for each slide of the slide deck in a second browser window. The systems and methods not only provide the user with the ability to view speaker notes, but also control the slideshow from the second browser window.

14 Claims, 8 Drawing Sheets

(56) References Cited

U.S. PATENT DOCUMENTS

| | | |
|---|---|---|
| 6,341,305 B2 | 1/2002 | Wolfe |
| 6,349,308 B1 | 2/2002 | Whang et al. |
| 6,349,314 B1 | 2/2002 | Patel |
| 6,377,957 B1 | 4/2002 | Jeyaraman |
| 6,418,441 B1 | 7/2002 | Call |
| 6,438,564 B1 | 8/2002 | Morton et al. |
| 6,501,779 B1 | 12/2002 | McLaughlin et al. |
| 6,662,210 B1 | 12/2003 | Carleton et al. |
| 6,766,333 B1 | 7/2004 | Wu et al. |
| 6,865,713 B1 | 3/2005 | Bates et al. |
| 7,031,954 B1 | 4/2006 | Kirsch |
| 7,035,910 B1 | 4/2006 | Dutta et al. |
| 7,069,502 B2 | 6/2006 | Numata et al. |
| 7,162,693 B2 | 1/2007 | Yamanaka et al. |
| 7,263,497 B1 | 8/2007 | Wiser et al. |
| 7,305,613 B2 | 12/2007 | Oezgen |
| 7,350,142 B2 | 3/2008 | Kraft et al. |
| 7,409,633 B2 | 8/2008 | Lerner et al. |
| 7,418,656 B1 | 8/2008 | Petersen |
| 7,424,670 B2 | 9/2008 | Burke et al. |
| 7,432,938 B1 | 10/2008 | Reuter et al. |
| 7,437,421 B2 | 10/2008 | Bhogal et al. |
| 7,478,330 B1 | 1/2009 | Branson et al. |
| 7,491,399 B2 | 2/2009 | Vakharia |
| 7,529,778 B1 | 5/2009 | Dewey et al. |
| 7,634,728 B2 | 12/2009 | Kraft |
| 7,656,543 B2 | 2/2010 | Atkins |
| 7,667,862 B2 | 2/2010 | Ziegler et al. |
| 7,680,932 B2 | 3/2010 | Defaix et al. |
| 7,698,379 B2 | 4/2010 | Dutta et al. |
| 7,739,255 B2 | 6/2010 | Hengel et al. |
| 7,774,703 B2 | 8/2010 | Junuzovic et al. |
| 7,779,347 B2 | 8/2010 | Christiansen et al. |
| 7,865,816 B2 | 1/2011 | Tanaka |
| 7,890,928 B2 | 2/2011 | Patrudu |
| 7,941,444 B2 | 5/2011 | Cragun et al. |
| 7,962,853 B2 | 6/2011 | Bedi et al. |
| 8,019,780 B1 | 9/2011 | Pinkerton et al. |
| 8,151,204 B2 | 4/2012 | Lusen et al. |
| 8,225,274 B2 | 7/2012 | Cowtan |
| 8,266,534 B2 | 9/2012 | Curtis et al. |
| 8,332,815 B2 | 12/2012 | Balfe et al. |
| 8,887,052 B1 * | 11/2014 | Young .................. H04L 12/1822 715/732 |
| 2001/0037346 A1 | 11/2001 | Johnson |
| 2002/0032701 A1 | 3/2002 | Gao et al. |
| 2002/0035580 A1 | 3/2002 | Tanabe |
| 2002/0051185 A1 | 5/2002 | Yamaguchi et al. |
| 2002/0133492 A1 | 9/2002 | Goldstein et al. |
| 2002/0174085 A1 | 11/2002 | Nelson et al. |
| 2002/0194302 A1 | 12/2002 | Blumberg |
| 2003/0037076 A1 | 2/2003 | Bravery et al. |
| 2003/0037303 A1 | 2/2003 | Bodlaender et al. |
| 2003/0048291 A1 | 3/2003 | Dieberger |
| 2003/0084078 A1 | 5/2003 | Torii et al. |
| 2003/0105719 A1 | 6/2003 | Berger et al. |
| 2003/0145279 A1 | 7/2003 | Bourbakis et al. |
| 2003/0160813 A1 | 8/2003 | Raju |
| 2004/0044965 A1 | 3/2004 | Toyama et al. |
| 2004/0085354 A1 | 5/2004 | Massand |
| 2004/0088653 A1 | 5/2004 | Bell et al. |
| 2004/0133444 A1 | 7/2004 | Defaix et al. |
| 2004/0201633 A1 | 10/2004 | Barsness et al. |
| 2004/0210833 A1 | 10/2004 | Lerner et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2004/0248612 A1 | 12/2004 | Lee et al. |
| 2004/0255005 A1 | 12/2004 | Spooner |
| 2004/0260594 A1 | 12/2004 | Maddox |
| 2004/0260714 A1 | 12/2004 | Chatterjee et al. |
| 2005/0055337 A1 | 3/2005 | Bebo et al. |
| 2005/0091291 A1 | 4/2005 | Kaler et al. |
| 2005/0125461 A1 | 6/2005 | Filz |
| 2005/0131887 A1 | 6/2005 | Rohrabaugh et al. |
| 2005/0144256 A1 | 6/2005 | Blumberg |
| 2005/0160355 A1 | 7/2005 | Cragun et al. |
| 2005/0160356 A1 | 7/2005 | Albornoz et al. |
| 2005/0160357 A1 | 7/2005 | Rivette et al. |
| 2005/0182650 A1 | 8/2005 | Maddox et al. |
| 2005/0185636 A1 | 8/2005 | Bucher |
| 2005/0200896 A1 | 9/2005 | Narusawa et al. |
| 2005/0223315 A1 | 10/2005 | Shimizu et al. |
| 2005/0268220 A1 | 12/2005 | Tanaka |
| 2006/0031751 A1 | 2/2006 | Ehud |
| 2006/0053194 A1 | 3/2006 | Schneider et al. |
| 2006/0053365 A1 | 3/2006 | Hollander et al. |
| 2006/0075332 A1 | 4/2006 | Fairweather et al. |
| 2006/0101071 A1 | 5/2006 | Henderson |
| 2006/0101328 A1 | 5/2006 | Albornoz et al. |
| 2006/0123348 A1 | 6/2006 | Ross et al. |
| 2006/0149831 A1 | 7/2006 | Dutta et al. |
| 2006/0161841 A1 | 7/2006 | Horiuchi et al. |
| 2006/0200755 A1 | 9/2006 | Melmon et al. |
| 2006/0230344 A1 | 10/2006 | Jennings et al. |
| 2006/0282762 A1 | 12/2006 | Diamond et al. |
| 2006/0282778 A1 | 12/2006 | Barsness et al. |
| 2007/0033654 A1 | 2/2007 | Wilson |
| 2007/0047008 A1 | 3/2007 | Graham et al. |
| 2007/0055926 A1 | 3/2007 | Christiansen et al. |
| 2007/0061714 A1 | 3/2007 | Stuple et al. |
| 2007/0070066 A1 | 3/2007 | Bakhash |
| 2007/0118794 A1 | 5/2007 | Hollander et al. |
| 2007/0118795 A1 | 5/2007 | Noyes et al. |
| 2007/0174762 A1 | 7/2007 | Plant |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0245248 A1 | 10/2007 | Christiansen |
| 2007/0250901 A1 | 10/2007 | McIntire et al. |
| 2007/0271502 A1 | 11/2007 | Bedi et al. |
| 2007/0288637 A1 | 12/2007 | Layton et al. |
| 2007/0294626 A1 | 12/2007 | Fletcher et al. |
| 2008/0028302 A1 | 1/2008 | Meschkat |
| 2008/0040659 A1 | 2/2008 | Doyle |
| 2008/0046837 A1 | 2/2008 | Beauchamp et al. |
| 2008/0059417 A1 | 3/2008 | Yamada et al. |
| 2008/0059539 A1 | 3/2008 | Chin et al. |
| 2008/0071827 A1 | 3/2008 | Hengel et al. |
| 2008/0082604 A1 | 4/2008 | Mansour et al. |
| 2008/0126943 A1 | 5/2008 | Parasnis et al. |
| 2008/0127212 A1 | 5/2008 | Nakamizo et al. |
| 2008/0168073 A1 | 7/2008 | Siegel et al. |
| 2008/0222273 A1 | 9/2008 | Lakshmanan et al. |
| 2008/0244371 A1 | 10/2008 | Sandstrom et al. |
| 2008/0244374 A1 | 10/2008 | Hattori |
| 2008/0270406 A1 | 10/2008 | Flavin et al. |
| 2008/0282167 A1 | 11/2008 | Beamish |
| 2008/0301571 A1 | 12/2008 | Herzog |
| 2009/0037585 A1 | 2/2009 | Miloushev et al. |
| 2009/0055755 A1 | 2/2009 | Hicks et al. |
| 2009/0089664 A1 | 4/2009 | Wagner et al. |
| 2009/0094329 A1 | 4/2009 | Ambati et al. |
| 2009/0112953 A1 | 4/2009 | Barsness et al. |
| 2009/0112990 A1 | 4/2009 | Campbell et al. |
| 2009/0119572 A1 | 5/2009 | Koivunen |
| 2009/0129596 A1 | 5/2009 | Chavez et al. |
| 2009/0132907 A1 | 5/2009 | Shao et al. |
| 2009/0157811 A1 * | 6/2009 | Bailor ............... G06F 17/30168 709/204 |
| 2009/0164620 A1 | 6/2009 | Ziegler et al. |
| 2009/0249224 A1 | 10/2009 | Davis et al. |
| 2009/0254802 A1 | 10/2009 | Campagna et al. |
| 2009/0254840 A1 | 10/2009 | Churchill et al. |
| 2009/0307585 A1 | 12/2009 | Tranchant et al. |
| 2010/0005410 A1 | 1/2010 | Pang |
| 2010/0023869 A1 | 1/2010 | Saint-Hilaire et al. |
| 2010/0030578 A1 | 2/2010 | Siddique et al. |
| 2010/0031135 A1 | 2/2010 | Naghshin et al. |
| 2010/0050089 A1 | 2/2010 | Kim et al. |
| 2010/0070852 A1 | 3/2010 | Li |
| 2010/0083096 A1 | 4/2010 | Dupuis-Latour et al. |

(56) References Cited

U.S. PATENT DOCUMENTS

| | | | |
|---|---|---|---|
| 2010/0169790 A1* | 7/2010 | Vaughan | G06F 3/0481 |
| | | | 715/740 |
| 2010/0169951 A1* | 7/2010 | Vaughan | G06F 3/0482 |
| | | | 726/3 |
| 2010/0205230 A1 | 8/2010 | Simeonov et al. | |
| 2010/0218099 A1 | 8/2010 | van Melle et al. | |
| 2010/0229086 A1 | 9/2010 | Howell et al. | |
| 2010/0235763 A1 | 9/2010 | Massand | |
| 2010/0245256 A1 | 9/2010 | Estrada et al. | |
| 2010/0251122 A1 | 9/2010 | Lee et al. | |
| 2010/0262659 A1 | 10/2010 | Christiansen et al. | |
| 2010/0269046 A1* | 10/2010 | Pahlavan | G06F 3/1462 |
| | | | 715/740 |
| 2010/0278453 A1 | 11/2010 | King | |
| 2010/0281076 A1 | 11/2010 | Pan et al. | |
| 2010/0309436 A1 | 12/2010 | Allen, Jr. et al. | |
| 2010/0318894 A1 | 12/2010 | Billharz et al. | |
| 2011/0035661 A1 | 2/2011 | Balinsky et al. | |
| 2011/0066957 A1 | 3/2011 | Prats et al. | |
| 2011/0078246 A1 | 3/2011 | Dittmer-Roche | |
| 2011/0078560 A1 | 3/2011 | Weeldreyer et al. | |
| 2011/0085211 A1 | 4/2011 | King et al. | |
| 2011/0099093 A1 | 4/2011 | Mills | |
| 2011/0164043 A1 | 7/2011 | Arora et al. | |
| 2011/0179427 A1 | 7/2011 | Krishnamoorthy et al. | |
| 2011/0219331 A1 | 9/2011 | DeLuca et al. | |
| 2011/0252339 A1 | 10/2011 | Lemonik et al. | |
| 2011/0264705 A1 | 10/2011 | Diamond | |
| 2011/0264712 A1 | 10/2011 | Ylonen | |
| 2011/0282933 A1 | 11/2011 | Schmier | |
| 2011/0296299 A1 | 12/2011 | Parker | |
| 2012/0036423 A1 | 2/2012 | Haynes, II et al. | |
| 2012/0096087 A1 | 4/2012 | Curcelli | |
| 2012/0117406 A1 | 5/2012 | Eun | |
| 2012/0131483 A1 | 5/2012 | Archer et al. | |
| 2013/0080507 A1 | 3/2013 | Ruhlen et al. | |
| 2013/0080785 A1 | 3/2013 | Ruhlen et al. | |
| 2015/0199350 A1 | 7/2015 | Raman et al. | |
| 2015/0350029 A1 | 12/2015 | Skrobotov | |

OTHER PUBLICATIONS (Remote Control Google Presentations with Your Android: No App Necessary), by Android for Academics, published Feb. 1, 2011, hereinafter as Android, pp. 1.*

Conner, Google Apps: The Missing Manual, published May 2008 by O'Reilly Media, Inc., pp. 1-26.*

MrNate (My experiences working with Google Docs Presentations, published Mar. 5, 2009, pages) (Year: 2009).*

Popa, "Now You Can: Insert YouTube Clips in Google Docs Presentations—Plus Speaker Notes in Google Docs Presentations," published Apr. 29, 2008 by Softpedia website, 5 pages.

Advisory Action dated Sep. 7, 2012 for U.S. Appl. No. 13/274,723, 4 pages.

Ellis et al., "Concurrency Control in Groupware Systems," ACM 1989, pp. 399-407.

Final Office Action dated May 31, 2012 for U.S. Appl. No. 13/274,720, 18 pages.

Final Office Action dated Jun. 1, 2012 for U.S. Appl. No. 13/274,797, 24 pages.

Final Office Action dated Jun. 14, 2012 for U.S. Appl. No. 13/275,093, 38 pages.

Final Office Action dated Jun. 20, 2012 for U.S. Appl. No. 13/274,723, 25 pages.

Huang et al., "A General Purpose Virtual Collaboration Room," Google 1999, pp. 1-9.

Kindberg, Mushroom: "A Framework for Collaboration and Interaction across the Internet," Google 1996, pp. 1-11.

Krieger, "Documents Presentations and Workbooks Using Microsoft Office to Create Content That Gets Noticed", published May 2011, pp. 1-104.

Mulvany, "What's Going on in Indexing," ACM 1997, pp. 10-15.

Munteaunu et al., "Collaborative Editing for Improved Usefulness and Usability of Transcript-Enhanced Webcasts," ACM 2008, pp. 373-382.

Non Final Office Action dated Aug. 31, 2012 for U.S. Appl. No. 13/275,101, 13 pages.

Non-Final Office Action dated Jan. 6, 2012 for U.S. Appl. No. 13/275,093, 32 pages.

Non-Final Office Action dated Jan. 11, 2012 for U.S. Appl. No. 13/274,797, 14 pages.

Non-Final Office Action dated Jan. 19, 2012 for U.S. Appl. No. 13/274,716, 12 pages.

Non-Final Office Action dated Feb. 29, 2012 for U.S. Appl. No. 13/274,723, 16 pages.

Non-Final Office Action dated Mar. 1, 2012 for U.S. Appl. No. 13/275,101, 9 pages.

Non-Final Office Action dated Jun. 12, 2012 for U.S. Appl. No. 13/274,716, 18 pages.

Non-Final Office Action dated Dec. 30, 2011 for U.S. Appl. No. 13/274,720, 14 pages.

Notice of Allowance dated May 14, 2012 for U.S. Appl. No. 13/275,044, 21 pages.

Pacull et al., Duplex: "A Distributed Collaborative Editing Environment in Large Scale," ACM 1994, pp. 165-173.

Raggett, (Siidy—a web based alternative to Microsoft PowerPoint), published 2006, pp. 1-13.

Simultaneously edit a presentation with other authors by MicrosoftTM Office: MAC, published Nov. 11, 2010, pp. 1-4.

Taylor (Cool Apple Keynote Presentation Troks and Tips), published Apr. 2011, pp. 1-5.

* cited by examiner

SYSTEMS AND METHODS FOR CONTROLLING THE DISPLAY OF ONLINE DOCUMENTS

CROSS-REFERENCE TO RELATED APPLICATIONS

This application is a continuation of U.S. patent application Ser. No. 13/275,123, filed Oct. 17, 2011 (pending), which is incorporated by reference herein in its entirety.

BACKGROUND

Electronic document processing applications are in widespread use in various industries including finance, business, law and academia. One type of electronic document processing application is a slideware application or presentation application. A presentation application is typically used to produce a presentation that is often a collection of slides or documents having media including text, pictures, embedded audio and video, and other rich media and interactive content.

Existing presentation applications tend to be software programs that execute locally on a computer system of a single user. The presentation slides produced by such a system can be difficult to distribute and difficult to modify or collaborate on when working in a group environment.

Recently, online presentation applications have been developed which have the ability for a number of users, potentially at physically remote locations relative to one another, to easily collaborate and modify presentation slides. Additionally, the online presentation application may allow users to present their slides at any remote location having online access.

However, presentation produced by online presentation applications lack some of the functionality of offline software-based presentation applications.

SUMMARY

A feature missing from current online document processing applications, especially online presentation applications, is the ability to control, from one browser window, the presentation of an online document running in another browser window. Such a feature is especially useful in the context of using presentation applications to present a slide deck. When presenting, users want to be able to do two things: control the progression of slides in the presentation and review any notes (or speaker notes) that they may have prepared to assist them with their presentation. It is also desirable that the speaker notes not appear on the same window as the slides. Current-day online presentation applications allow users to view their presentation slides in one browser window and their speaker notes in another separate browser window. Thus, the users can view their speaker notes, while their audience views, separately, the presentation. However, these online presentation applications do not allow the users to control the progression of slides from the speaker notes window. Therefore, users would have to jump back and forth between the two windows to progress the slides and review their speaker notes. The present disclosure describes systems and methods that provide this missing feature.

Generally, the systems and methods described herein are directed to computerized methods for controlling from one browser window, an online application being displayed on another browser window. More particularly, in one aspect, the systems and methods described herein are directed to computerized methods for rendering and controlling a presentation document in an online presentation application. The methods may include displaying, on a first browser window at a client computing device, a first portion of a presentation document. The methods may further include receiving, in a second browser window at the client computing device, a request for displaying a second portion of the presentation document on the first browser. The methods may then include replacing, in the first browser window of the client computing device, the displayed first portion of the presentation document with the second portion of the presentation document based on the request received at the second browser window. In certain embodiments, the first portion and second portion of the presentation document includes one or more presentation slides.

The methods may include opening the second browser window in response to a request received at the first browser window. The methods may further include displaying, on the second browser window at the client computing device, one or more user input components for allowing users to submit a request. The one or more user input components may include at least one of an image, button, text box, radio-button, and check-box. The methods described herein may further include displaying, on the second browser window at the client computing device, a third portion of the presentation document, which may include one or more pages of notes. The first browser window may receive a request for displaying the third portion of the presentation document in this second browser window.

In certain embodiments, the first portion of the presentation document is replaced with the second portion of the presentation document in the first browser window based on the request received at the first browser window. The first browser window may be configured to display speaker notes and the computerized methods may further include displaying, on the first browser window, a third portion of the presentation document including one or more pages of notes.

In another aspect, the systems and methods described herein include computerized methods for rendering and controlling Hypertext Markup Language (HTML) data and Cascading Style Sheets (CSS) data in a browser. The methods may include receiving, in a first browser window at a client computing device, a first set of data including HTML, CSS and Javascript data, and receiving, in the second browser window at the client computing device, a request for replacing the first set of data with a second set of data including HTML, CSS and Javascript data. The methods may further include replacing, in the first browser window of the client computing device, the first set of data with the second set of data based on the request received in the second browser window. The first browser window may be configured to listen for requests received in the second browser window. The methods may further include displaying, on the second browser window at the client computing device, one or more user input components for allowing users to submit a request. The second browser window may also be configured to receive a third set of data including HTML and CSS data.

In certain embodiments, the first browser window receives the second set of data from a server and creates the second browser window. The first browser window may also receive requests submitted by users. The first set of data may be replaced with the second set of data based on such a request in the first browser window.

In another aspect, the systems and methods described herein include systems for rendering and controlling a presentation document in an online presentation application. The systems may include a first browser window and a second browser window. The first browser window may include a client engine for running the online presentation application, and a user interface for displaying a portion of the presentation document to a user and receiving requests from the user. The second browser window may include a user interface for controlling the presentation document displayed on the first browser window. The second browser may also include a user interface for receiving a portion of the presentation document from the user. In certain embodiments, the client engine may include a controller for generating the second browser window, listening to requests received at the second browser window, and replacing the displayed portion of the presentation document in the first browser with another portion of the presentation document based on the received requests.

According to the system, the client engine may be configured to provide HTML, CSS and Javascript data to the user interface in the first browser. The client engine may be configured to receive Javascript calls from the user interface in the first browser. In certain embodiments, the client engine is configured to receive data corresponding to the presentation document and online presentation application data from a server. The user interface in at least one of the first browser and the second browser may include components receptive to inputs received from at least one of a mouse, keyboard, HTML frame/object, and HTML form. The components may be receptive to at least one of mouse double-clicks, mouse down, mouse up, mouse over, mouse move, mouse out, key down, key press, and key up.

BRIEF DESCRIPTION OF THE DRAWINGS

The above and other advantages of the disclosure will be apparent upon consideration of the following detailed description, taken in conjunction with the accompanying drawings, in which like reference characters refer to like parts throughout, and in which.

DETAILED DESCRIPTION OF ILLUSTRATED EMBODIMENTS

To provide an overall understanding of the invention, certain illustrative embodiments will now be described, including systems and methods for displaying a document on a plurality of client computing devices by a server. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
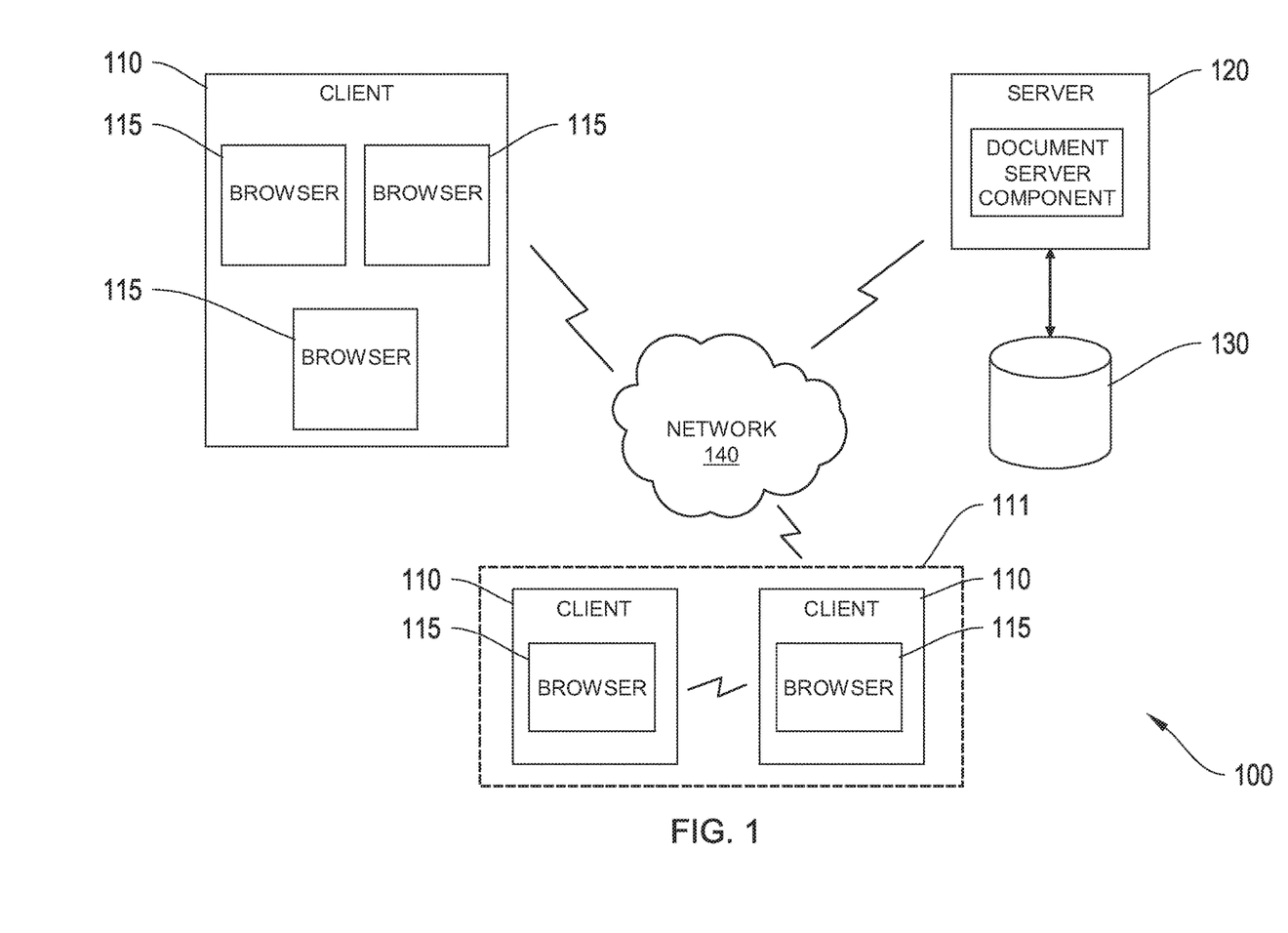
FIG. 1 is a block diagram depicting an online multi-browser system, according to an illustrative embodiment of the invention.
Figure 2:
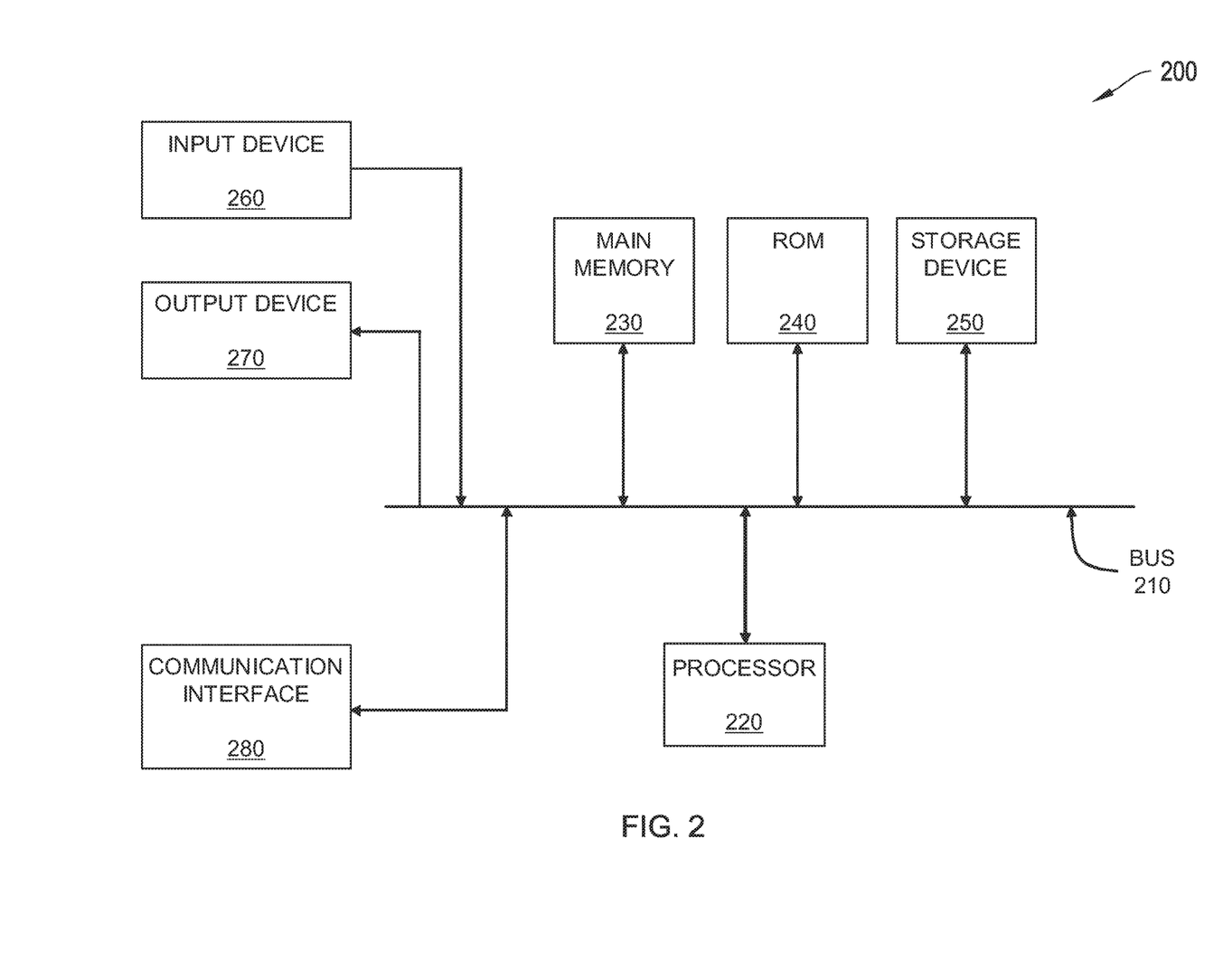
FIG. 2 is a block diagram depicting an exemplary computing device illustrated in FIG. 1.
Figure 3:
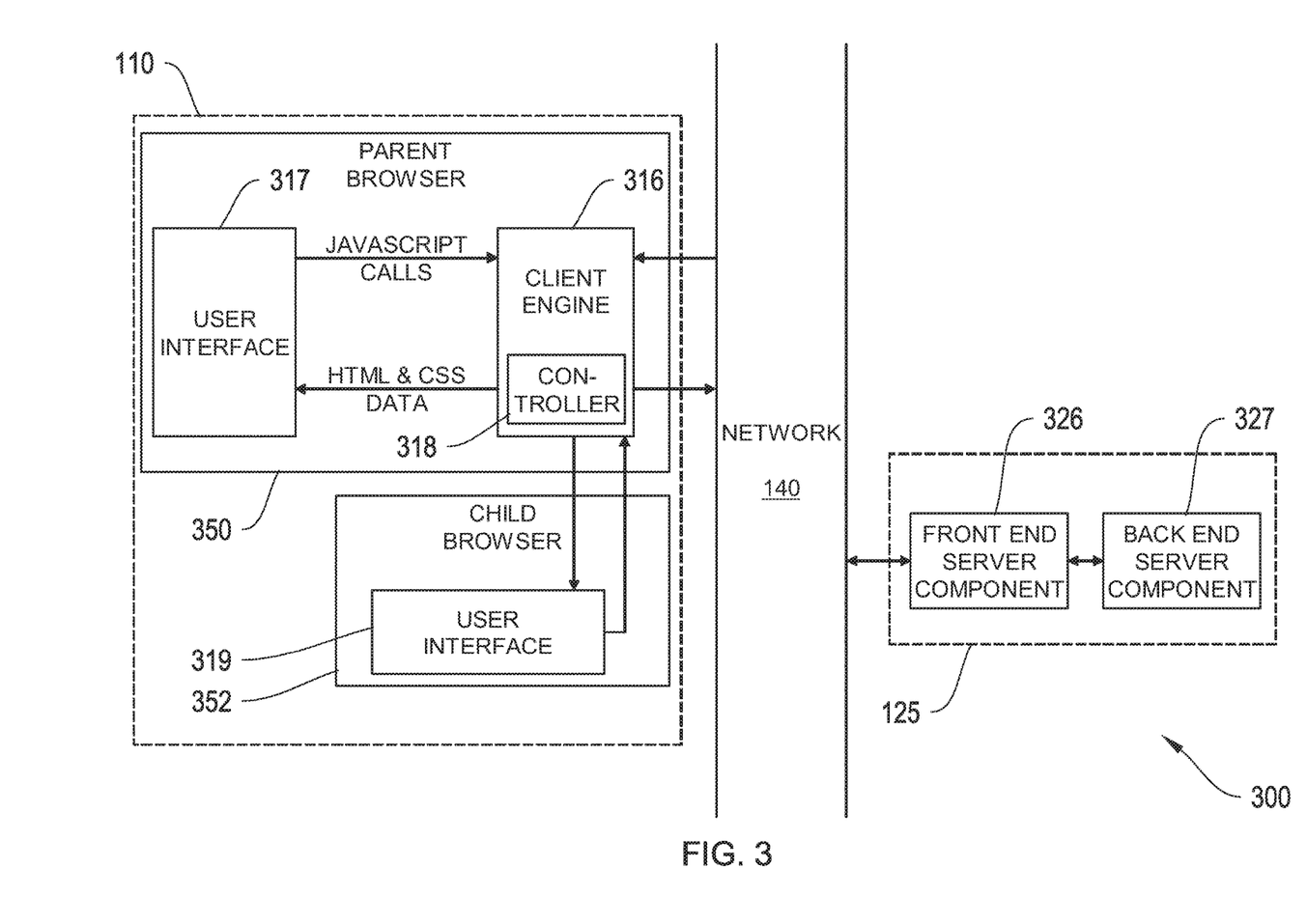
FIG. 3 is a block diagram depicting an implementation of the system of FIG. 1, according to an illustrative embodiment of the invention.
Figure 4:
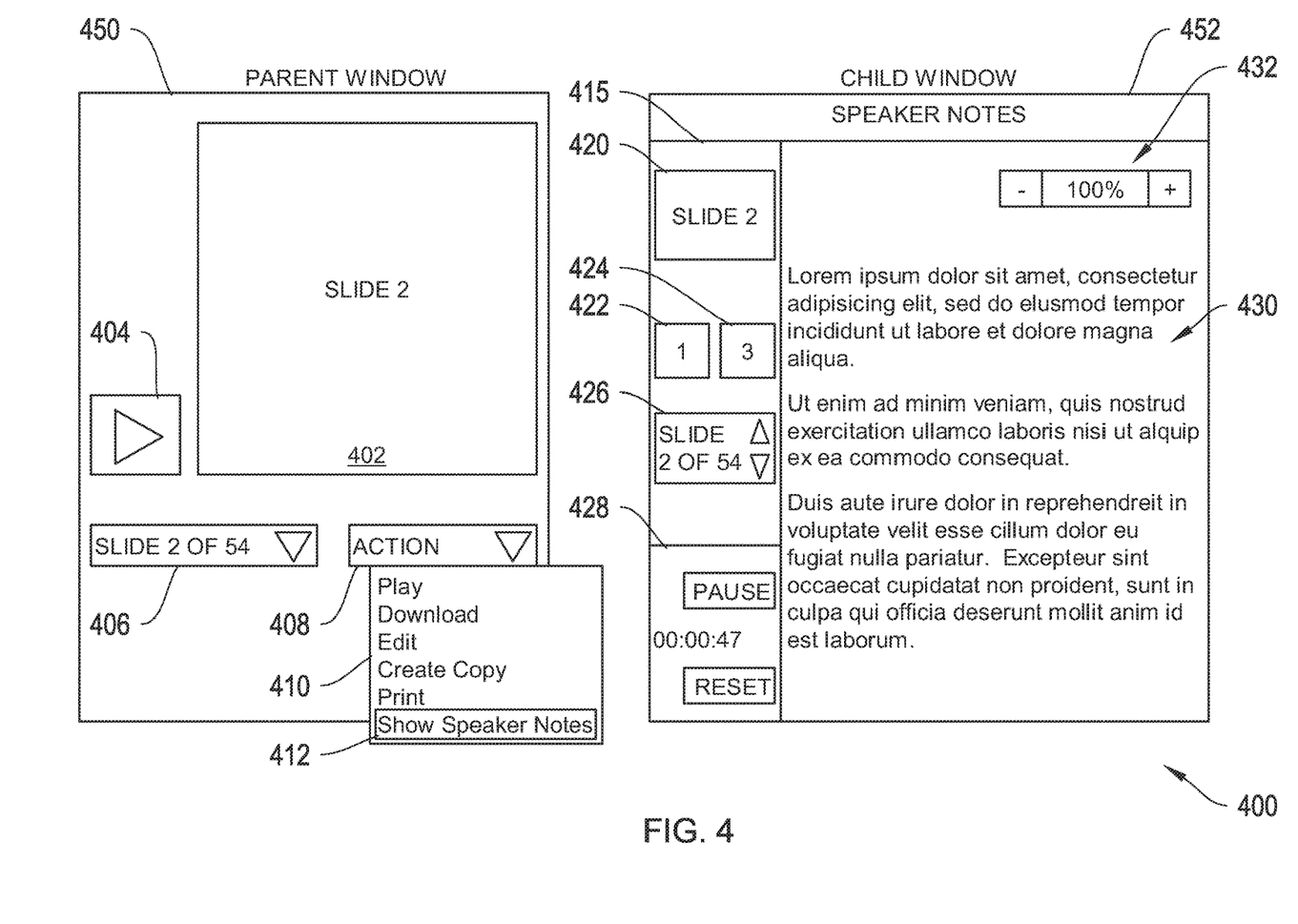
FIG. 4 is a block diagram depicting an exemplary presentation application interface that may be presented across multiple browsers to a user.

Generally, the systems and methods described herein include software and hardware for controlling, from one browser window, the display of information in an online document processing application on another browser window. For example, the systems and methods described herein provide a user with the ability to view a presentation slide deck on a first browser window while simultaneously viewing speaker notes for each slide of the slide deck in a second browser window. The systems and methods not only provide the user with the ability to view speaker notes, but also control the slideshow from the second browser window. FIGS. 1 and 2 provide an overview of an exemplary system, computing devices, and methods used to provide such an online document processing application. FIGS. 3 and 4 describe in more detail one exemplary system having two browsers—a parent browser and a child browser—running an online presentation application. FIGS. 5-8 provide exemplary methods, according to the present disclosure, for controlling an online presentation application running in a parent browser window from either the parent browser window itself or from a child browser window.

General System Description

FIG. 1 is a block diagram depicting an online multi-browser system 100, according to an illustrative embodiment of the invention. System 100 includes multiple clients 110 that can connect to servers, such as server 120, via a network 140. Network 140 may include a local area network (LAN), a wide area network (WAN), a telephone network, such as the Public Switched Telephone Network (PSTN), an intranet, the Internet, or a combination of networks. Three clients 110 and one server 120 are illustrated as connected to network 140 for simplicity. Two clients 110 are shown as being associated with a single user 111. In practice, there may be more clients, users and/or servers. Also, in some instances, a client may perform one or more functions of a server and a server may perform one or more functions of a client.

A client 110 may include a device, such as a personal computer, a laptop computer, a wireless telephone, a personal digital assistant (PDA), mobile devices, smart phones, touch-responsive tablet devices, or another type of computation or communication device. In certain embodiments, a client 110 may include display devices including a projection screen or television display. Users of clients 110 may access or receive information from server 120.

In the implementation shown, clients 110 may generally interact with server 120 such that clients 110, in conjunction with server 120, execute an online document application, such as an online presentation application. Server 120 may include software, labeled as document server component 125, to assist implementing the online presentation application. Online presentation applications created by users of clients 110 may be stored by server 120 in, for example, a database on storage media 130. Although illustrated as a single device in FIG. 1, server 120 may be implemented as, for example, a single computing device or as multiple distributed computing devices. One of ordinary skill in the art will appreciate that whether a device is functioning as a server or a client often depends on the specific application being implemented. That is, whether a computing device is operating as a client or a server may depend on the context of the role of the computing device within the application. The relationship of client and server arises by virtue of computer programs running on the respective computers and having a client-server relationship to each other.

The interaction of clients 110 with server 120 may be through browser programs 115 at clients 110. For example, the online presentation application may be a web application that runs within browsers 115. In this manner, clients 110 may not be required to install any presentation specific software to use the online presentation application at client 110. When browsers or browser programs are discussed herein, these terms are intended to refer to any program that allows a user to browse markup documents (e.g., web documents), regardless of whether the browser program is a stand alone program or an embedded program, such as a browser program included as part of an operating system.

FIG. 2 is an exemplary diagram of computing device 200, such as one of clients 110 or server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of processor, microprocessor, or processing logic that interprets and executes instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits a user to input information to computing device 200, such as a keyboard, a mouse, a pen, voice recognition and/or biometric mechanisms, etc. Output device 270 may include a conventional mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 140.

Document server component 125 may be implemented in software and stored in a computer-readable medium, such as memory 230. A computer-readable medium may be defined as one or more physical or logical memory devices and/or carrier waves.

The software instructions defining document server component 125 may be read into memory 230 from another computer-readable medium, such as data storage device 250, or from another device via communication interface 280. The software instructions contained in memory 230 cause processor 220 to perform processes that will be described later. Alternatively, hardwired circuitry may be used in place of or in combination with software instructions to implement processes consistent with the present disclosure. Thus, implementations consistent with the principles of the systems and methods described are not limited to any specific combination of hardware circuitry and software.

Online Presentation Application System

An online presentation application, as described herein, may be implemented as a distributed web application in which portions of the application execute at one or more of clients 110 and at server 120. More specifically, clients 110 that wish to use the online presentation application may request the presentation application from server 120. In response, server 120 may transmit portions of the presentation application for local execution at clients 110. The online presentation application may thus execute as a distributed application across server 120 and one or more of clients 110.

FIG. 3 is a block diagram depicting an implementation of the system 300 (or system 100 of FIG. 1), according to an illustrative embodiment of the invention. FIG. 3 depicts a client 110 having two browsers—a parent browser 350 and a child browser 352. In one example, when presenting, users may display the parent browser, having a slideshow, on a projector screen, while viewing a child browser from their laptop computer on a podium. As was described with reference to FIG. 1, system 300 may also include two or more clients, one running a parent browser and the others running child browsers. The parent browser 350 includes a client engine 316 and a user interface 317. The client engine 316 further includes a controller 318. The child browser 352 includes a user interface 319. The client 110 is connected via a network 140 to a document server component 125. Document server component 125 includes a front-end component 326 and a back-end component 327. Front-end component 326 may include a web and/or XML server that interfaces with clients 110. For example, front-end component 326 may receive HTTP requests from clients 110 and transmit XML data to clients 110. Back-end component 327 may perform the more substantive processing related to the presentation application, such as the calculation of functions required to update a set of slides.

In certain embodiments, portions of the online presentation application executes within clients 110. Client engine 316, within parent browser 350, may be implemented using, for example, Javascript that is downloaded from server 120 when needed by client 110. User interface 317 may provide the final user interface that is displayed in browsers 350 and 352 based on, for example, HTML (hyper-text markup language) and CSS (cascading style sheets) data supplied from client engine 316.

User interface 317 and client engine 316, together, act to reduce the start-stop start-stop nature of traditional browser-based web applications, as client engine 316 adds a client-side layer that can handle many of the user interactions with user interface 317. Instead of loading a web page at the start of a user session, browser 350 may load client engine 316 from server 120 (or, alternatively, from a local cache). Client engine 316 may be responsible for both rendering the interface the user sees and communicating with server 120 on the user's behalf. Client engine 316 allows the user's interaction with the online presentation application to happen asynchronously, i.e., independent of communication with server 120.

The client engine 316 further includes a controller 318, which is configured with code to create the child browser 352 and exchange data, including but not limited to HTML, CSS, Javascript, with the user interface 319 of child browser 352. In certain embodiments, the controller 318 may receive HTML and CSS data to be displayed in the child browser 352 from the server 120 (or, alternatively, from a local cache).

During operation, the client engine 316 initiates a user session of the presentation application within the parent browser 350. Upon a request from a user, via user interface 317, the controller 318, may open a child browser 352 for displaying speaker notes and other information to the user via user interface 319. In certain implementations, the controller 318 may communicate directly or indirectly (via network 140) to the child browser 352. The user may, via user interface 319 in child browser 352, choose to control the progression of slides displayed in the parent browser. The controller 318 is programmed to subscribe to events such as button clicks or keyboard presses while the user is on the child browser 352. Upon detection of such an event, the controller updates the slides in the parent browser 350, and the child browser 352 updates the speaker notes.

In one implementation, the client-side operation of the online presentation application may be implemented using the known Asynchronous JavaScript And XML (AJAX) web development techniques, although one of ordinary skill in the art will recognize that other technologies could be used.

Although, the parent browser 350 and child browser 352 are shown, in FIG. 3, as being within a single client device 110, in certain implementations, the parent browser 350 and the child browser 352 may be on different clients. In such implementations, referring to system 100 shown in FIG. 1, parent browser 350 may include browser 115 in client 110 and child browser 352 may include browser 115 located in client 110 operated by user 111. In such implementations, the parent and child browsers are in separate client devices. In one example, a user may use their mobile device, smart phone, tablet or any suitable device for controlling a presentation being displayed on a different computing device. The different computing device may include another computer or laptop or any suitable computing device that may or may not be connected to a projection screen for displaying the presentation. In certain implementations, the different computing device is embedded within a projection screen. The different computing device may also include another mobile device, smart phone, tablet or any other suitable device so that while one device is viewing the presentation, another device is controlling the progression of the presentation slides.

In certain implementations, during operation of a system having parent and child browsers on different devices, the client engine 316, instead of communicating directly with the child browser 352, communicates via the network 140 and server 120. The client engine 316 may initiate a user session of the presentation application within the parent browser 350. Upon a request from a user in local or remote client device, via user interfaces 317 or 319, the server 120, may open a child browser 352 for displaying speaker notes and other information to the user via user interface 319. The user may, via user interface 319 in child browser 352 on a different client device, choose to control the progression of slides displayed in the parent browser 350.

The parent browser 350 may, itself, be initiated by the server 120. In such implementations, upon receiving a request from one or more client devices, the server 120 initiates a parent browser 350 on a client device to run the presentation application. Upon receiving a request from an authorized user, the server 120 may initiate a child browser 352 on the same client device or a different client device. The server 120 may request additional authorization to allow a user to operate the child browser 352 and thereby control the presentation being displayed on the parent browser 350.

The authorized user may include at least one of a user operating a client device having the parent browser 350, a user operating a client device intended to have the child browser 352, a user operating a client device having the child browser 352, and a user authorized by a user of the client device having the parent browser 350. The authorized user may generally include any user possessing suitable credentials to view or run the presentation.

In certain implementations, a user may initiate the child browser 352 from a location remote to the location of the parent browser 350. For example, a first user may be viewing a presentation remotely via videoconference. The presentation may be running on a different computing device operated by a second user. In such an example, the second user may send a link to the first user to allow the first user to access and open a child browser 352 in the first user's remote location. The first user may then, via the child browser 352 control the slides in the presentation.

Additionally and optionally, the systems and methods described herein may be adapted to allow for a plurality of parent browsers 350 and a plurality of child browsers 352. In such arrangements, one child browser 352 may be configured to operate presentations running on a plurality of parent browsers 350. The child browser 352 may control the operation of the same or different presentations running on the plurality of parent browsers 350. For example, the child browser 350 may function as a dashboard having user interface elements for simultaneously control a plurality of different presentation slide decks. In another arrangement, a plurality of child browsers 352 may be configured to control a single parent browser 350. In such an arrangement, a plurality of users collaborating on a presentation slide deck may have child browsers 352 capable of controlling the presentation running on a single browser 350. Generally, one or more child browsers 352 in one or more client devices may be configured to control one or more parent browsers 350 in one or more of the same or different client devices.

User Interface

FIG. 4 is a block diagram depicting an exemplary presentation application interface 400 that may be presented across multiple browsers to a user. Interface 400 depicts the interface displayed to the user when presenting a slide show. In particular, interface 400 includes a parent browser window 450 and a child browser window 452. The parent browser 450 includes slides 402, a progress button 404, slide selector menu 406 and an action menu 408. The action menu 408 includes a list of user-selectable items including "Show speaker notes" item 412. The parent browser 450 may include any number of text boxes, media placeholders, forms, buttons, drop-down menus, radio buttons, checkboxes as desirable without departing from the scope of the invention. When displayed, users may view and modify one or more slides in their presentation.

The child browser window 452 depicts speaker notes 430 along with other useful information for the user. In particular, the child browser window 452 includes slide preview section 415 having a slide preview 420, a previous slide preview/selector 422, a next slide preview/selector 424 and a slide selector menu 426. The child browser window 452 further includes a timing section 428 having a time indicator, a pause button and a reset button. The user interface may include any number of browsers configured to control each other. The user interface may also include any number of input components (e.g., buttons) and output components (e.g., slides) without departing from the scope of the invention.

Methods of Operation

Figure 5:
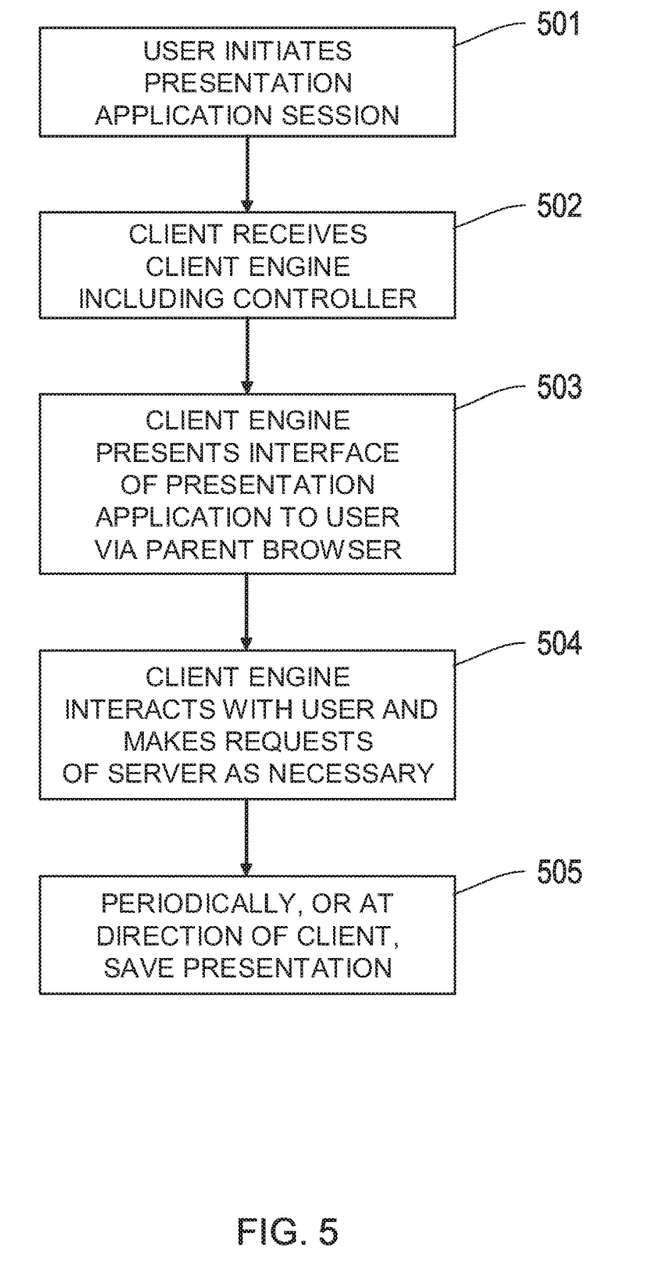
FIG. 5 is a flow chart depicting the overall operation of the various components of the system of FIG. 1 implemented as an online presentation application.

Turning to FIGS. 5-8, the methods of operation of system 100 of FIG. 1 (and system 300 of FIG. 3) will be described in more detail. FIG. 5 is a flow chart depicting the overall operation of the various components of the system of FIGS. 1 and 3 implemented as an online presentation application. A user at one of clients 110 may initiate a presentation application session (step 501). For instance, the user of a client 110 may contact front-end component 326 using parent browser 350. In some implementations, the user may be required to have previously registered or created an account with and be logged into document server component 125.

In response to the user initiating a presentation session, the document server component 125 may transmit client engine 316 to the client 110 (step 502). Some portions of client engine 316 may be cached at client 110 from a previous session, in which case these portions do not need to be re-downloaded from server 120. In some implementations, the programming code that comprises client engine 316 may be implemented in a modular manner. In this situation, portions of client engine 316 may be transmitted to client 110 on an as-demand basis as the functionality of those portions of client engine 316 are needed by client 110. For example, client engine 316 may implement a number of "core" functions, such as basic user interaction and display functions, that are always transmitted to client 110, while other functions, such as more specialized presentation functions, may be transmitted to client 110 on an as-need basis. Additionally, some functions of online presentation application may always be executed by back-end component 327 and may therefore never be transmitted to client engine 316.

Because client engine 316 can be transmitted to client 110 as needed by client 110, the online presentation application may be an entirely web-based application in which the client does not need to pre-install any portion of client engine 316. Advantageously, a user will typically be able to use the online presentation application from any computing device that includes a compatible browser 115 and that is connected to network 140.

Client engine 316, once loaded at client 110, may present, via user interface 317, the graphical user interface (interface 400 of FIG. 4) of a slide deck to the user (step 503). The slides 450 are the data object that the presentation application presents to the user. The slide deck presented to a user may be a "blank" slide deck from which the user may begin a new presentation document, a presentation document retrieved from a previous session of the online presentation application, or a version of the presentation document imported from a conventional presentation document (e.g., an ".pptx" document, a ".key" document, or other types of known presentation document formats).

Through interface 400 of FIG. 4, a user can, for example, enter text and media into the presentation slides and perform formatting operations relating to the slide deck. In response, client engine 316 interacts with and makes requests of document server component 120 as necessary (step 504). The above-described functions and operations that are allowable by the online presentation application are exemplary. Through the interface 400, the online presentation application may permit a user to perform numerous operations that are generally recognized as being consistent with a presentation application.

In one implementation, client engine 316 may handle most or all of the functionality associated with responding to user actions relating to navigating and/or formatting the interface without needing to contact document server component 125. Other functions of the presentation application may be handled by logic in back-end component 327. By handling formatting and data entry feedback locally at client 110, the online presentation application can provide a high level of responsiveness to user actions that tend to occur frequently and for which users expect immediate feedback.

One of ordinary skill in the art will recognize that in alternate implementations, the division of functions executed at client engine 316 and back-end component 327 may be modified such that client engine 316 handles more or fewer functions and similarly, back-end component 327 may also handle more or fewer functions.

Periodically, or at the explicit direction of the user via interface 400, the data that comprises the presentation document may be saved (step 505). In one possible implementation, the presentation document may be saved by document server component 125 to database 130. In this manner, the presentation document may be accessible by the user (or by other users) from any computing device connected to network 140.

As described above, the user may interact and select from several options in interface 400 in FIG. 4. For example, at the start of a presentation, the user may choose to view speaker notes in a separate browser window. Accordingly, the user may select the "Show speaker notes" button 412 in the action menu 408 in the parent browser window 450.

Figure 6:
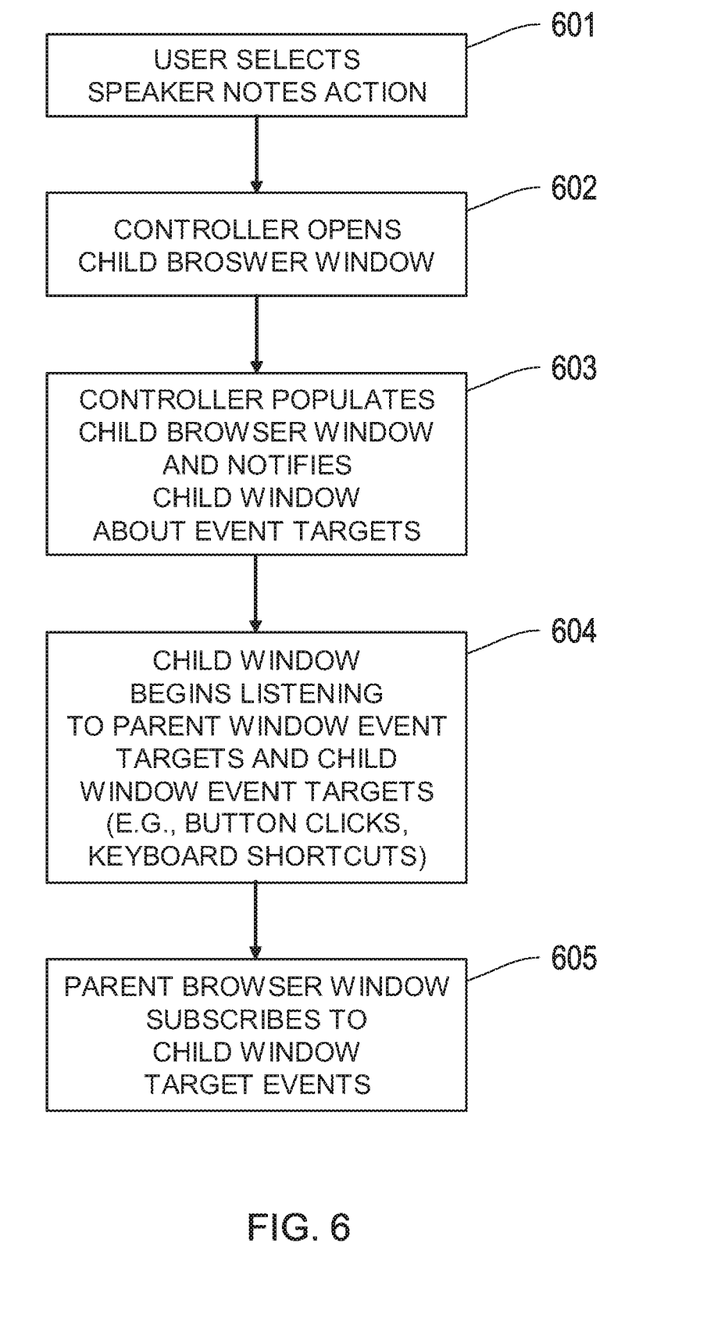
FIG. 6 is a flow chart depicting the operation of the various components of the system of FIG. 1 when displaying speaker notes in a presentation application.

FIG. 6 shows the various steps that the system performs when a user selects the show speaker notes option (step 601). In particular, FIG. 6 is a flow chart depicting the operation of the various components of the system of FIG. 1 when displaying speaker notes in a presentation application. The controller 318 in the client engine 316 runs code to open a "blank" new child browser window 452 (step 602). If a window was already opened, the controller 318 may close the open window and then open a new child window. In certain embodiments, the controller 318 may select a unique name when opening a new child window.

Once the new child window is opened, the controller 318 populates the new child window with HTML and CSS from the server (step 603) or a local cache. In particular, the HTML and CSS data includes, among other things, the contents of the speaker notes to be displayed in section 430, the contents of the slides to be displayed in section 415 and other information related to the arrangement and appearance of the child window 452.

Additionally, the controller 318 provides the child browser window 352 information about event targets (step 603). Events may include operations involving user interactions with the user interface in the parent browser or child browser. Typical events may include inputs from a mouse or pointing device, keyboard or typing device, HTML frame/object, HTML form, and other user interfaces. Some examples of inputs from a mouse include double-clicks, mouse down, mouse up, mouse over, mouse move and mouse out. Some example of inputs from a keyboard include key down, key press, key up.

In certain embodiments, an event target may relate to an event such as selecting with a mouse, clicking-on a button, or using a keyboard shortcut in the parent browser window 450 or child browser window 452. Event targets in the parent browser window 450 may include slide progress button 404, or an item from the slide selector menu 406. In certain embodiments, mouse clicks anywhere on the slide 402 may be an event target to indicate slide advancement. Similarly, event targets in the child browser window 452 may include buttons 422 or 424 for moving slides forward or backward, slide selector 426, or any other portion of the child window 452. Generally, event targets may be assigned to any portion of the parent and child browser windows.

Returning to FIG. 6, the child window 352 may include code for listening to parent window 350 event targets and child window event targets. The child window 352 may begin listening for parent window event targets (step 604) using an event handler script. The parent browser, particularly the controller 318, also subscribes to child window event targets (step 605).

Figure 7:
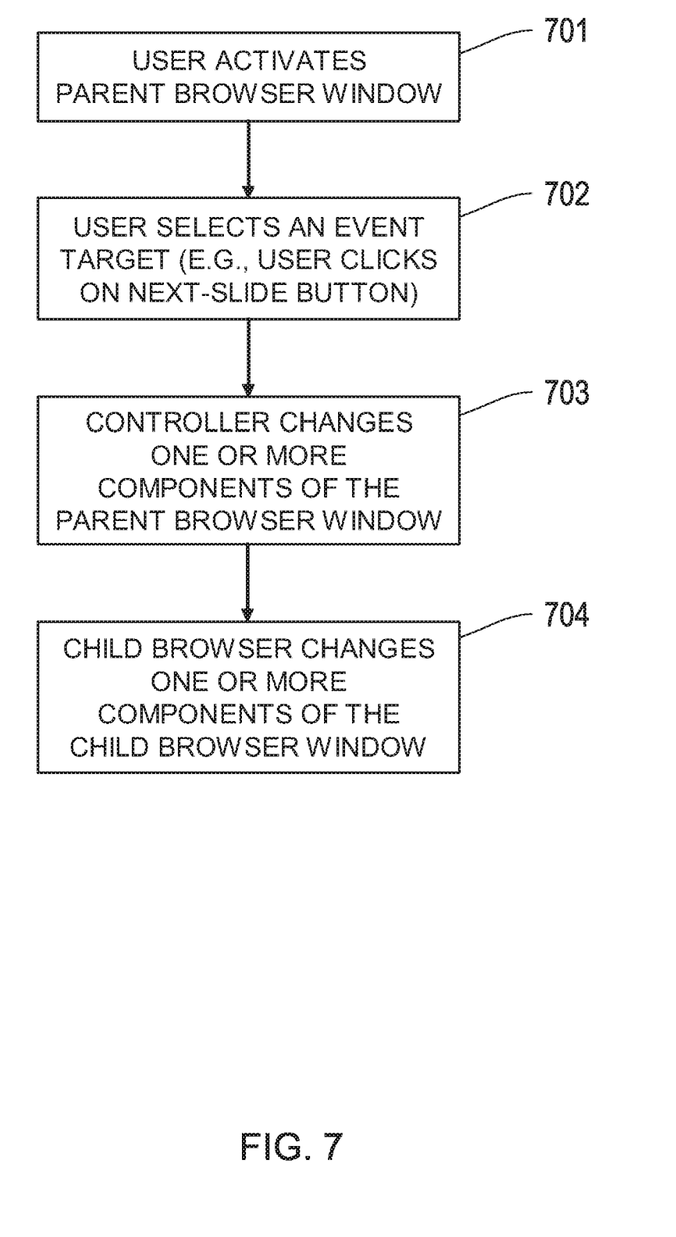
FIG. 7 is a flow chart depicting the operation of the various components of the system of FIG. 1 when the user navigates presentation slides using the parent browser window.

During use of the online presentation application, a user may select the parent browser window or the child browser as being active. FIG. 7 depicts the various steps that the system performs when the user selects the parent browser window as being active (step 701). In particular, the user may click on an event target. For example, the user may desire to advance the slide and click on the slide progress button 404 (step 702). The controller 318, listening for such an event, may read this button click as an event and run the corresponding Javascript to advance the slides in the parent browser window 450 (step 703). The child browser, also listening for such an event in the parent window (as described with reference step 604 in FIG. 6), initiates changes within the child browser window to advance the slide in the preview section 415 and update the speaker notes section 430 to correspond to the new slide (step 704). The child window may also update its other components to conform to the new slide and any passage of time.

Figure 8:
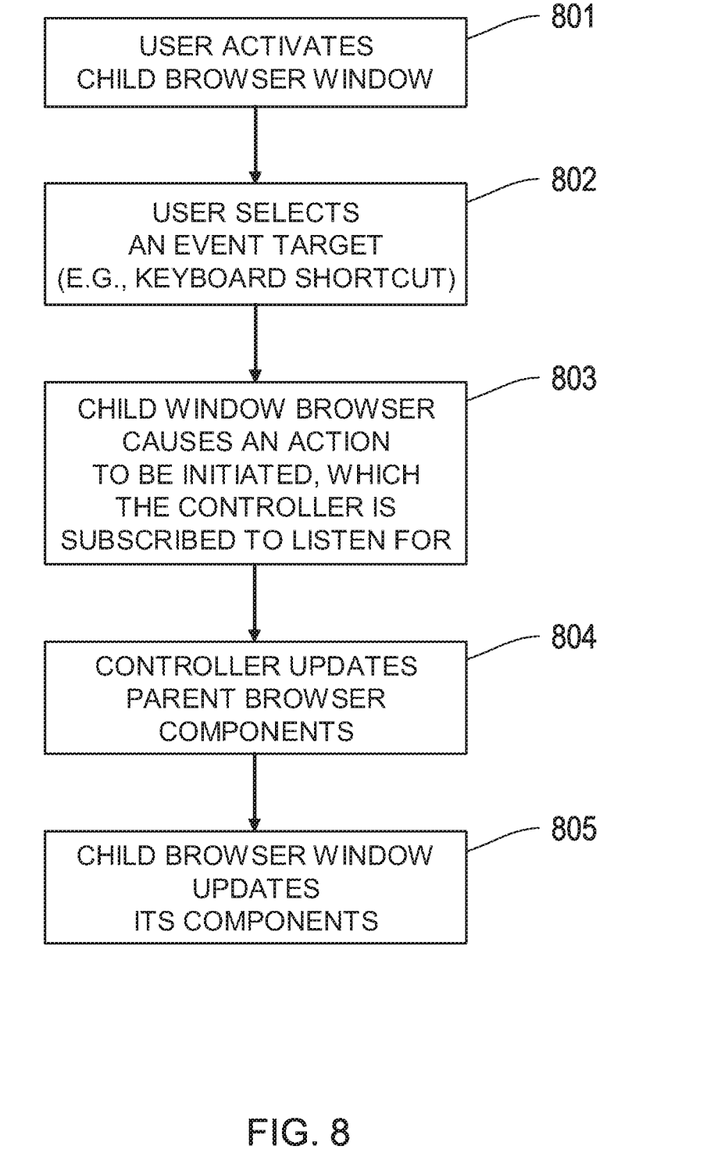
FIG. 8 is a flow chart depicting the operation of the various components of the system of FIG. 1 when the user navigates presentation slides using the child browser window.

In certain embodiments, during use of the online presentation application, a user may select the child browser window as being active. FIG. 8 depicts the various steps that the system performs when the user desires to control the parent browser window from the child browser window. An example of such situation is when a user is reviewing speaker notes while presenting the slide deck. The speaker may be standing at a podium delivering a presentation to an audience. The audience may be able to view the slide deck (parent browser window 450) on a large projection screen while the user is viewing the speaker notes (child browser window) on a laptop at the podium. In such an example, the slides are typically running from the same laptop and the user may be controlling the advancement of the slides. During the presentation, the user may desire to view the speaker notes and select the child window, thereby automatically deselecting the parent browser window (step 801).

In certain embodiments, when the user is ready to advance a slide, the user may select an event target in the child window (step 802). For example, the user may select button 424 in child window 452 to move from slide 2 to slide 3. When the user selects such an event target, the child browser causes an action to be initiated which the controller 318 is subscribed to listen for (step 803). Consequently, the controller 318 updates runs one or more Javascript functions and updates the parent browser window to advance the slides (step 804). The child window also updates its components to advance the slide in the preview section 415 and update the speaker notes section 430 to correspond to the new slide (step 805). Advantageously, according to systems and methods described herein, the child browser window does not need to include Javascript for controlling slides. Instead slide progression and control is handled by the controller 318 which is subscribed to listen to child window event targets such as keyboard shortcuts and mouse clicks.

It will be apparent to one of ordinary skill in the art that aspects of the present disclosure, as described above, may be implemented in many different forms of software, firmware, and hardware in the implementations illustrated in the figures. The actual software code or specialized control hardware used to implement aspects consistent with the principles of the disclosure is not limiting of the invention. Thus, the operation and behavior of the aspects of the disclosure were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Further, certain portions of the disclosure may be implemented as "logic" or a "component" that performs one or more functions. This logic may include hardware, such as an application specific integrated circuit or a field programmable gate array, software, or a combination of hardware and software.

What is claimed is:

1. A method for controlling a presentation document in an online presentation application, comprising:

transmitting, from a first client computing device to a server, a request to initiate a presentation application session of the online presentation application;

providing content of the presentation document comprising a plurality of slides for presentation in a first browser window of a first web browser application at the first client computing device;

receiving, during the presentation application session, a first control message from a second web browser application at a second client computing device to change the content of the presentation document from a first slide to a second slide of the presentation document for presentation in the first browser window at the first client computing device, wherein the first control message is based on a user input via a second browser window of the second web browser application, wherein first notes corresponding to the first slide of the presentation document are presented at the second browser window;

responsive to receiving the first control message from the second web browser application, executing a script by a client engine of the first client computing device that causes the content of the presentation document to change from the first slide to the second slide without providing second notes associated with the second slide for presentation in the first browser window, wherein the second browser window is to present the second notes corresponding to the second slide; and automatically saving the presentation document to the server.

2. The method of claim 1, further comprising:

determining whether a user associated with the first control message is authorized to control the content of the presentation document displayed in the first browser window.

3. The method of claim 1, further comprising:

determining whether a user associated with the second client computing device is an authorized user; and in response to determining that the user is the authorized user, initiating the second browser window at the second client computing device.

4. The method of claim 1, further comprising:
receiving edits to the content of the presentation document, at the first client computing device, from the second web browser application and a third browser application of a third client computing device.

5. The method of claim 1, wherein the content of the presentation document displaying in the first browser window is synchronized with notes displayed in the second browser window.

6. The method of claim 1, wherein the second client computing device is associated with a user having credentials that authorizes the user to control the content of the presentation document displayed in the first browser window at the first client computing device.

7. A first client computing device for controlling a presentation document in an online presentation application, comprising:
a memory;
at least one processor coupled to the memory, the at least one processor configured to:
transmit, from the first client computing device to a server, a request to initiate a presentation application session of the online presentation application;
provide content of the presentation document comprising a plurality of slides for presentation in a first browser window of a first web browser application at the first client computing device;
receive, during the presentation application session, a first control message from a second web browser application at a second client computing device to change the content of the presentation document from a first slide to a second slide of the presentation document for presentation in the first browser window at the first client computing device, wherein the first control message is based on a user input via a second browser window of the second web browser application and is initiated by the second web browser application, wherein first notes corresponding to the first slide of the presentation document are presented at the second browser window;
responsive to receiving the first control message from the second web browser application, executing a script by a client engine of the first client computing device that causes the content of the presentation document to change from the first slide to the second slide without providing second notes associated with the second slide for presentation in the first browser window, wherein the second browser window is to present the second notes corresponding to the second slide; and
automatically save the presentation document to the server.

8. The first client computing device of claim 7, wherein the at least one processor is further configured to:
determine whether a user associated with the first control message is authorized to control the content of the presentation document displayed in the first browser window.

9. The first client computing device of claim 7, wherein the at least one processor is further configured to:

determine whether a user associated with the second client computing device is an authorized user, and
responsive to determining that the user is the authorized user, initiate the second browser window on second computing device.

10. The first client computing device of claim 7, wherein the at least one processor is further configured to:
receive edits to the content of the presentation document, at the first client computing device, from the second web browser application and a third browser application of a third client computing device.

11. The first client computing device of claim 7, wherein a display of the presentation document at the second browser window is synchronized with notes of the presentation document at the first browser window.

12. The first client computing device of claim 7, wherein the second client computing device is associated with a user having credentials that authorizes the user to control the presentation document.

13. A non-transitory computer-readable medium comprising instructions that, responsive to execution by one or more processors of a first client computing device, cause the processors to perform operations comprising:
transmitting, from the first client computing device to a server, a request to initiate a presentation application session of an online presentation application;
providing content of a presentation document comprising a plurality of slides for presentation in a first browser window of a first web browser application at the first client computing device;
receiving, during the presentation application session, a first control message from a second web browser application at a second client computing device to change the content of the presentation document from a first slide to a second slide of the presentation document for presentation in the first browser window at the first client computing device, wherein the first control message is based on a user input via a second browser window of the second web browser application and is initiated by the second web browser application, wherein first notes corresponding to the first slide of the presentation document are presented at the second browser window;
responsive to receiving the first control message from the second web browser application, executing a script function by a client engine of the first client computing device that causes the content of the presentation document to change from the first slide to the second slide without providing second notes associated with the second slide for presentation in the first browser window, wherein the second browser window is to present the second notes corresponding to the second slide; and
automatically saving the presentation document to the server.

14. The non-transitory computer-readable medium of claim 13, the operations further comprising:
determining whether a user associated with the first control message is authorized to control the content of the presentation document displayed the first browser window.

* * * * *